United States Patent [19]

Masuyama et al.

[11] Patent Number: 4,490,318
[45] Date of Patent: Dec. 25, 1984

[54] SEMICONDUCTIVE CERAMIC MATERIALS WITH A VOLTAGE-DEPENDENT NONLINEAR RESISTANCE, AND PROCESS FOR PREPARATION

[75] Inventors: Masaru Masuyama, Gunma; Susumu Hirooka, Takasaki; Nobutatsu Yamaoka, Gunma, all of Japan

[73] Assignee: Taiyo Yuden Co., Ltd., Tokyo, Japan

[21] Appl. No.: 562,429

[22] Filed: Dec. 16, 1983

Related U.S. Application Data

[62] Division of Ser. No. 441,219, Nov. 12, 1982, Pat. No. 4438214.

[30] Foreign Application Priority Data

Nov. 26, 1981 [JP] Japan .................................. 56-18959

[51] Int. Cl.³ ............................................. C04B 35/46
[52] U.S. Cl. ..................................... 264/61; 252/520; 264/65; 264/66
[58] Field of Search ......................... 264/61, 65, 66; 252/520

[56] References Cited

U.S. PATENT DOCUMENTS

| 4,073,846 | 2/1978 | Masumura | 264/61 |
| 4,339,511 | 7/1982 | Morgan | 264/61 |
| 4,380,559 | 4/1983 | Mandai | 264/61 |

FOREIGN PATENT DOCUMENTS 81105268.7 7/1981 European Pat. Off. .

OTHER PUBLICATIONS

U.S. Serial Number 280,801 filed Jul. 6, 1981.

Primary Examiner—John A. Parrish
Attorney, Agent, or Firm—Woodcock, Washburn, Kurtz, Mackiewicz & Norris

[57] ABSTRACT

Semiconductive ceramic materials suitable for use in varistors, consisting essentially of a major proportion of $Sr_{(1-x)}Ca_xTiO_3$, where x is from about 0.01 to about 0.50, the balance being at least one of $Nb_2O_5$, $Ta_2O_5$, $WO_3$, $La_2O_3$, $CeO_2$, $Nd_2O_3$, $Y_2O_3$, $Sm_2O_3$, $Pr_6O_{11}$ and $Dy_2O_3$, and $Na_2O$. The ceramic materials may further comprise a minor proportion of at least one of $Ag_2O$, $CuO$, $MnO_2$ and $SiO_2$, and/or a minor proportion of $Al_2O_3$. For the fabrication of ceramic bodies of the above compositions there are prepared mixtures of the noted ingredients in powdered form in various possible combinations, plus an organic binder. The mixtures are molded under pressure into desired shape. The moldings are first fired in a reductive or neutral atmosphere and then refired in an oxidative atmosphere. $Na_2O$ can be included in the initial mixtures in the form of $Na_2O$ itself and/or other Na compound such as NaF. Alternatively, either $Na_2O$ itself or NaF is pasted and coated on the moldings after the initial firing thereof. The subsequent refiring of the coated moldings causes thermal diffusion of $Na_2O$ therein.

8 Claims, 3 Drawing Figures

SEMICONDUCTIVE CERAMIC MATERIALS WITH A VOLTAGE-DEPENDENT NONLINEAR RESISTANCE, AND PROCESS FOR PREPARATION

This is a division of application Ser. No. 441,219 filed Nov. 12, 1982 now U.S. Pat. No. 4,438,214 issued Mar. 20, 1984.

BACKGROUND OF THE INVENTION

Our invention relates to ceramic materials in general and, in particular, to semiconductive ceramic materials composed principally of strontium calcium titanate, $Sr_{(1-x)}Ca_xTiO_3$, and to a process for the fabrication of coherent bodies of such ceramic materials. Having a voltage-dependent nonlinear resistance, the ceramic materials according to our invention find a typical application in varistors, known also as voltage-dependent resistors, enabling the same to function both as such and as capacitors.

Parallel connections of varistors and capacitors have been used extensively for the absorption or suppression of abnormal voltages in electronic circuits. It is obvious, then, that devices possessing both varistor and capacitor functions can attain the same purpose with simpler circuit configurations. Varistors capable of such a dual function have been suggested by European Patent Publication No. 44,981 filed by Taiyo Yuden Co., Ltd., and dated Feb. 3, 1982.

The published European patent application proposes semiconductive ceramic materials in a perovskite structure composed primarily of strontium titanate, $SrTiO_3$. The nonlinear volt-ampere characteristic of the materials makes them well suited for use in the dual-purpose varistors which are capable of single-handedly suppressing abnormal voltages. Although satisfactory for most practical purposes, the varistors in accordance with the prior art ceramic compositions have proved to have some properties in need of improvement. One of these is the temperature dependency of the varistor voltage (i.e., in the volt-ampere curve of the varistor, the voltage at which the current starts rising in magnitude). Another is the capability of withstanding voltage and current surges in use.

SUMMARY OF THE INVENTION

In consideration of the noted weaknesses of the prior art we seek to provide improved semiconductive ceramic materials, and a process for their preparation, for the provision of dual-purpose varistors whose varistor voltages change less with temperatures and which suffer less from voltage and current surges. We also seek to make higher the nonlinearity coefficients of such varistors.

Basically, the ceramic materials contemplated by our invention consist essentially of 100 mole parts of $Sr_{(1-x)}Ca_xTiO_3$, where x is a numeral from about 0.01 to about 0.50, from about 0.01 to about 3.00 mole parts of at least one metal oxide selected from the class consisting of niobium oxide, $Nb_2O_5$, tantalum oxide (tantalic acid anhydride), $Ta_2O_5$, tungstic oxide (tungstic acid anhydride), $WO_3$, lanthanum oxide (lanthana), $La_2O_3$, ceric oxide (cerium dioxide), $CeO_2$, neodymium oxide (neodymia), $Nd_2O_3$, yttrium oxide (yttria), $Y_2O_3$, samarium oxide, $Sm_2O_3$, praseodymium oxide (praseodymia), $Pr_6O_{11}$, and dysprosium oxide (dysprosia), $Dy_2O_3$, and from about 0.02 to about 2.50 mole parts of sodium monoxide, $Na_2O$.

As is seen from the above summary, the ceramic materials in accordance with our invention comprise at least three ingredients. The first or major ingredient, $Sr_{(1-x)}Ca_xTiO_3$, serves primarily to reduce the temperature dependency of the varistor voltages of varistors made from the ceramic materials. The second ingredient or second set of ingredients, one or more of the listed metal oxides, function to render the materials semiconducting. The third ingredient, $Na_2O$, is effective to render surgeproof the varistors made from the ceramic materials.

According to another aspect of our invention the ceramic materials further comprise, as a fourth ingredient, from about 0.01 to about 3.00 mole parts of at least one oxide selected from the class consisting of silver oxide (argentous oxide), $Ag_2O$, black copper oxide, $CuO$, manganese dioxide, $MnO_2$, and silicon dioxide (silica), $SiO_2$. The fourth ingredient or set of ingredients serve to improve the nonlinearity coefficients of the varistors made from the materials.

According to still another aspect of our invention the ceramic materials further comprise from about 0.01 to about 1.50 mole parts of aluminum oxide (alumina), $Al_2O_3$, in addition to the first to third ingredients or to the first to fourth ingredients. This additive contributes to improvement in the nonlinearity coefficient, and the temperature dependency of the varistor voltage, of the varistors fabricated from the inventive materials.

We also provide a method of manufacturing discrete, coherent bodies of the above ceramic compositions. The method dictates, first of all, the preparation of mixtures of the noted ingredients in powdered form in various possible combinations, plus an organic binder. The mixtures are molded into desired shape at a pressure usually ranging from about 500 to about 2000 kilograms per square centimeter ($kg/cm^2$). The moldings are fired in a temperature range from about 1300° C. to about 1500° C. in a nonoxidative atmosphere, and then refired in a temperature range from about 850° C. to about 1350° C. in an oxidative atmosphere.

The third ingredient, $Na_2O$, can be either included in the starting mixture or later thermally diffused in the fired moldings. According to some preferred methods disclosed herein, the moldings of various mixtures of the ingredients excluding $Na_2O$ are fired in a reductive atmosphere. Then either $Na_2O$ itself, or other sodium compound such as sodium fluoride, NaF, or both are pasted and coated on the fired moldings. Then the coated moldings are refired in a temperature range from 900° C. to 1300° C. thereby to cause thermal diffusion of $Na_2O$ in the ceramic bodies.

The methods of our invention outlined above make possible the easy, inexpensive manufacture of semiconductive ceramic bodies that exhibit very favorable performance characteristics on being processed into varistors. The nonlinearity coefficient and varistor voltage of the varistors are controllably variable by changing the temperature or period or both of the refiring of the moldings in an oxidative atmosphere.

The above and other features and advantages of our invention and the manner of attaining them will become more apparent, and the invention itself will best be understood, from a study of the following description and appended claims, with reference had to the attached drawings.

DETAILED DESCRIPTION OF THE INVENTION

Figure 1:
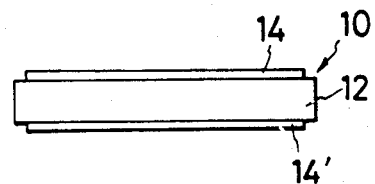
FIG. 1 is a schematic side elevation of a typical varistor made from the semiconductive ceramic materials of our invention.

We will now describe our invention in terms of Examples, dealing with specific compositions of the ceramic materials in accordance with our invention, with specific methods of formulating bodies of such compositions and of processing them into varistors, and with the electrical properties of the varistors. As will become apparent as the description proceeds, some of the Examples do not comply with the principles of our invention. Such noninventive Examples are given to clearly distinguish the other, inventive Examples and to give support to the claimed numerical limitations of the invention. We understand, of course, that these Examples, either inventive or noninventive, are purely to illustrate or explain and not to impose limitations upon the invention.

Hereinafter in this specification all parts and percentages are molar unless otherwise specified.

EXAMPLES 1–62

The first ingredient, $Sr_{(1-x)}Ca_xTiO_3$, was prepared from $SrCO_3$, $CaCO_3$ and $TiO_2$ with purities over 99.0 percent. The x of the general formula expressing the first ingredient was set at five different values of 0.01, 0.20, 0.40, 0.50 and 0.55, to obtain the following five examples of the first ingredient:

$Sr_{0.99}Ca_{0.01}TiO_3$;
$Sr_{0.80}Ca_{0.20}TiO_3$;
$Sr_{0.60}Ca_{0.40}TiO_3$;
$Sr_{0.50}Ca_{0.50}TiO_3$; and
$Sr_{0.45}Ca_{0.55}TiO_3$.

$SrCO_3$, $CaCO_3$ and $TiO_2$ were combined in various sets of proportions required to provide the above five different examples of the first ingredient. The combinations of the three substances in the different sets of proportions were each intimately intermingled in a bowl mill for 10 hours, then dried and crushed. Then the crushed mixtures were fired at 1200° C. for two hours. Then the firings were pulverized to provide the above five examples of the first ingredient in finely divided form.

To 100 parts of each example of the first ingredient there were added, as the second ingredient or set of ingredients, one or more of $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, and $Sm_2O_3$, all in finely divided form and with purities of 99.0 percent, and, as the third ingredient or set of ingredients, either or both of $Na_2O$ and $NaF$ in finely divided form, in various combinations of proportions set forth in Table 1. A total of sixty-two combinations of the three or more ingredients, in different sets of proportions, were thus prepared.

Then the above mixtures in powdered form were each intimately blended together by being agitated dry in a mortar for 20 hours. Then from 10 to 15 percent by weight of an organic binder in the form of polyvinyl alcohol was added to each mixture to granulate the same. Test discs were formed from the granulated mixtures by pressing at approximately 1500 kg/cm². Each disc was sized 10 mm in diameter and 0.8 mm in thickness. The discs were fired at approximately 1350° C. for four hours in a reductive (nonoxidative) atmosphere consisting of 95 percent by capacity of molecular nitrogen, $N_2$, and five percent by capacity of molecular hydrogen, $H_2$. Then the discs were refired, for oxidization, in a temperature range from 1000° C. to 1200° C. for three hours in air (oxidative atmosphere).

Thus were completed the semiconductive ceramic test discs of Examples 1–62 in accordance with our invention. The test discs had compositions corresponding to the starting materials. The only exception was the NaF which was used as one of the starting materials in some Examples. This sodium compound was thermally converted into $Na_2O$ in the completed test discs. Accordingly Table 1, as well as other similar tables presented subsequently, recites not only the proportions of the sodium compound or compounds as a starting material or materials but also the proportions of $Na_2O$ derived therefrom by the firing and actually contained in the completed test discs.

The ceramic test discs prepared as above were further processed into test varistors in order to examine their properties. FIG. 1 of the attached drawings shows each completed test varistor 10, comprising a semiconductive ceramic test disc 12 in accordance with our invention and a pair of electrodes 14 and 14' on its opposite faces. The electrodes were formed by coating the opposite faces of each disc with a commercial silver electroding composition and baking the coatings at 800° C.

The thus fabricated ceramic test varistors were then tested as to varistor voltage ($V_1$), nonlinearity coefficient ($\alpha$), temperature dependency ($\Delta V_1$) of the varistor voltage, capacitance (C), percent variation ($\Delta V_{1P}$) of the varistor voltage after application of voltage surges to the varistors, percent variation ($\Delta \alpha_P$) of the nonlinearity coefficient after surge application, and temperature dependency ($\Delta V_{1T}$) of the varistor voltage after surge application. Table 2 represents the results for all the varistors of Examples 1–62.

Figure 2:
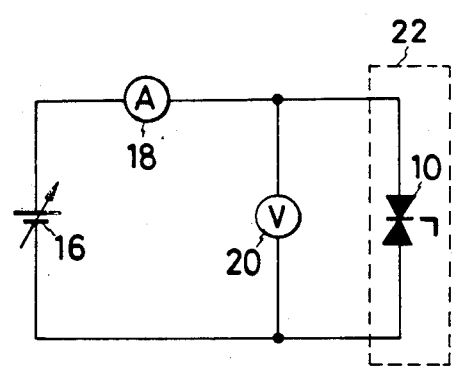
FIG. 2 is a schematic electrical diagram of a circuit for the measurement of some properties of the varistors, such as that of FIG. 1, made from the materials of our invention.

FIG. 2 illustrates an electric circuit that we used for measuring the varistor voltages, as defined previously, of the ceramic test varistors 10. Each varistor to be tested was connected across the opposite polarity terminals of a constant direct-current (DC) source 16. An ammeter 18 was connected between varistor 10 and DC source 16, and a voltmeter 20 was connected in parallel with the varistor. The varistor 10 was placed in a vessel 22 in which the temperature was thermostatically maintained at 20° C. A current ($I_1$) of one milliampere (mA) was made to flow through the test varistor, and the corresponding voltage across the varistor was measured by the voltmeter 20 and taken as the varistor voltage ($V_1$).

We also used the circuit of FIG. 2 for measuring the nonlinearity coefficient ($\alpha$) of each test varistor 10. In addition to the varistor voltage the voltage ($V_{10}$) was measured when a current ($I_{10}$) of 10 mA was made to flow through the test varistor. The nonlinearity coefficient was then determined by the equation:

$$\alpha = \frac{\log (I_{10}/I_1)}{\log (V_{10}/V_1)} = \frac{1}{\log (V_{10}/V_1)}$$

For the measurement of the temperature dependency ($\Delta V_1$) of the varistor voltage ($V_1$) of each test varistor 10, the temperature of the vessel 22 was varied in the range from $-40°$ C. to $+125°$ C. At each vessel temperature (T, °C.) a current of 1 mA was made to flow through the test varistor, and the varistor voltage ($V_{1T}$) at that time was measured. The percent variation of the varistor voltage ($V_{1T}$) at each temperature from the varistor voltage ($V_1$) at 20° C. was then computed from the following equation to give the temperature dependency ($\Delta V_1$) of the varistor voltage:

$$\Delta V_1 = \frac{V_{1T} - V_1}{V_1} \times \frac{100}{T(°C.) - 20(°C.)} \quad (\%/°C.)$$

Table 2, as well as other similar tables presented subsequently, represents only the maximum value of $\Delta V_1$ in the above temperature range for each Example.

Figure 3:
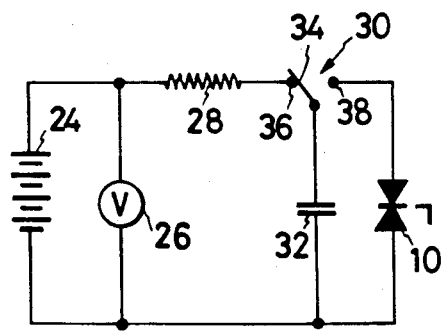
FIG. 3 is a schematic electrical diagram of a circuit for the application of surges to the varistors in order to examine their abilities of withstanding surges.

FIG. 3 illustrates a circuit employed for the application of high voltage pulses or surges to the test varistors, in order to re-examine their properties after such surge application. A constant DC voltage source 24 of two kilovolts (kV) was connected in parallel with a voltmeter 26. The positive terminal of the voltage source 24 was connected via a five-ohm resistor 24 to one of the two fixed contacts, 36, of a singlepole double-throw switch 30. The movable contact 34 of this switch was connected to a 2.5-microfarad capacitor 32 whereas the other fixed contact of the switch was connected to each test varistor 10.

It will be seen that the capacitor 32 is charged from the voltage source 24 during engagement of the movable contact 34 of the switch 30 with the fixed contact 36 and is discharged upon engagement of the movable contact with the other fixed contact 38, resulting in the application of a surge to the test varistor 10. Five such surges were impressed in succession to each test varistor at intervals of five seconds. Thereafter the varistor voltage ($V_{1P}$) and nonlinearity coefficient ($\alpha_P$) of the test varistor were measured by the circuit of FIG. 2. The percent variation ($\Delta V_{1P}$) of the varistor voltage after surge application was then computed by the equation:

$$\Delta V_{1P} = \frac{V_{1P} - V_1}{V_1} \times 100(\%)$$

The following equation was used for the determination of the percent variation ($\Delta \alpha_P$) of the nonlinearity coefficient after surge application:

$$\Delta \alpha_P = \frac{\alpha_P - \alpha}{\alpha} \times 100(\%)$$

The temperature dependency ($\Delta V_{1T}$) of the varistor voltage of each test varistor after subjection to five successive surges in the circuit of FIG. 3 was ascertained by the circuit of FIG. 2 in the same way as the temperature dependency ($\Delta V_1$) of the varistor voltage.

The capacitances (C) of the test varistors were measured at 1 kHz and are represented in Table 2 in nanofarads (nF).

TABLE 1

| | | Ceramic compositions in mole parts | | | | | Postfiring third ingredient ($Na_2O$), parts |
|---|---|---|---|---|---|---|---|
| Examples | First ingredient, x | parts | Second ingredient, substance | parts | Third ingredient, substance | parts | |
| 1 | 0.01 | 100 | $Nb_2O_5$ | 0.01 | $Na_2O$ | 0.02 | 0.02 |
| 2 | 0.01 | 100 | $La_2O_3$ | 0.50 | $Na_2O$ | 0.50 | 0.50 |
| 3 | 0.01 | 100 | $Dy_2O_3$ | 1.00 | $Na_2O$ | 1.00 | 1.00 |
| 4 | 0.01 | 100 | $Ta_2O_5$ | 2.00 | $Na_2O$ | 1.50 | 1.50 |
| 5 | 0.01 | 100 | $WO_3$ | 3.00 | $Na_2O$ | 2.50 | 2.50 |
| 6 | 0.20 | 100 | $CeO_2$ | 0.01 | NaF | 1.00 | 0.50 |
| 7 | 0.20 | 100 | $Nd_2O_3$ | 0.50 | NaF | 1.00 | 0.50 |
| 8 | 0.20 | 100 | $Sm_2O_3$ | 1.00 | NaF | 1.00 | 0.50 |
| 9 | 0.20 | 100 | $Y_2O_3$ | 2.00 | NaF | 1.00 | 0.50 |
| 10 | 0.20 | 100 | $Pr_6O_{11}$ | 3.00 | NaF | 1.00 | 0.50 |
| 11 | 0.40 | 100 | $Nb_2O_5$ | 0.50 | $Na_2O$ | 1.50 | 1.50 |
| 12 | 0.40 | 100 | $Dy_2O_3$ | 0.50 | $Na_2O$ | 1.50 | 1.50 |
| 13 | 0.40 | 100 | $WO_3$ | 0.50 | $Na_2O$ | 1.50 | 1.50 |
| 14 | 0.40 | 100 | $Sm_2O_3$ | 0.50 | $Na_2O$ | 1.50 | 1.50 |
| 15 | 0.40 | 100 | $Y_2O_3$ | 0.50 | $Na_2O$ | 1.50 | 1.50 |
| 16 | 0.50 | 100 | $La_2O_3$ | 2.00 | $Na_2O$ | 0.02 | 0.02 |
| 17 | 0.50 | 100 | $Pr_6O_{11}$ | 2.00 | $Na_2O$ | 0.02 | 0.02 |
| 18 | 0.50 | 100 | $Nd_2O_3$ | 2.00 | $Na_2O$ | 0.02 | 0.02 |
| 19 | 0.50 | 100 | $CeO_2$ | 2.00 | $Na_2O$ | 0.02 | 0.02 |
| 20 | 0.50 | 100 | $Nb_2O_5$ | 2.00 | $Na_2O$ | 0.02 | 0.02 |
| 21 | 0.01 | 100 | $Ta_2O_5$ | 0.01 | NaF | 5.00 | 2.50 |
| 22 | 0.01 | 100 | $Sm_2O_3$ | 0.01 | NaF | 5.00 | 2.50 |
| 23 | 0.01 | 100 | $Y_2O_3$ | 0.01 | NaF | 5.00 | 2.50 |
| 24 | 0.01 | 100 | $Nd_2O_3$ | 0.01 | NaF | 5.00 | 2.50 |
| 25 | 0.01 | 100 | $La_2O_3$ | 0.01 | NaF | 5.00 | 2.50 |
| 26 | 0.20 | 100 | $Ta_2O_5$ | 0.50 | NaF | 2.00 | 1.00 |
| 27 | 0.20 | 100 | $Nb_2O_5$ | 1.00 | NaF | 2.00 | 1.00 |
| 28 | 0.20 | 100 | $Dy_2O_3$ | 3.00 | NaF | 2.00 | 1.00 |
| 29 | 0.20 | 100 | $WO_3$ | 1.00 | NaF | 2.00 | 1.00 |
| 30 | 0.20 | 100 | $CeO_2$ | 0.50 | NaF | 2.00 | 1.00 |
| 31 | 0.40 | 100 | $La_2O_3$ | 0.01 | $Na_2O$ | 2.50 | 2.50 |
| 32 | 0.40 | 100 | $Ta_2O_5$ | 0.50 | $Na_2O$ | 2.50 | 2.50 |
| 33 | 0.40 | 100 | $Dy_2O_3$ | 2.00 | $Na_2O$ | 2.50 | 2.50 |
| 34 | 0.40 | 100 | $Pr_6O_{11}$ | 0.50 | $Na_2O$ | 2.50 | 2.50 |
| 35 | 0.40 | 100 | $WO_3$ | 0.01 | $Na_2O$ | 2.50 | 2.50 |
| 36 | 0.50 | 100 | $Pr_6O_{11}$ | 0.01 | NaF | 0.04 | 0.02 |
| 37 | 0.50 | 100 | $Nd_2O_3$ | 0.50 | NaF | 1.00 | 0.50 |
| 38 | 0.50 | 100 | $Y_2O_3$ | 1.00 | NaF | 2.00 | 1.00 |
| 39 | 0.50 | 100 | $Sm_2O_3$ | 2.00 | NaF | 3.00 | 1.50 |
| 40 | 0.50 | 100 | $Nd_2O_3$ | 3.00 | NaF | 5.00 | 2.50 |
| 41 | 0.55 | 100 | $Nb_2O_5$ | 0.01 | $Na_2O$ | 0.50 | 0.50 |
| 42 | 0.55 | 100 | $La_2O_3$ | 0.50 | $Na_2O$ | 0.50 | 0.50 |
| 43 | 0.55 | 100 | $Dy_2O_3$ | 1.00 | $Na_2O$ | 0.50 | 0.50 |
| 44 | 0.40 | 100 | $Ta_2O_5$ | 0.01 | $Na_2O$ | 3.00 | 3.00 |
| 45 | 0.40 | 100 | $Y_2O_3$ | 2.00 | NaF | 6.00 | 3.00 |
| 46 | 0.20 | 100 | $Sm_2O_3$ | 3.50 | NaF | 2.00 | 1.00 |
| 47 | 0.20 | 100 | $La_2O_3$ | 3.50 | NaF | 2.00 | 1.00 |
| 48 | 0.20 | 100 | $WO_3$ | 3.50 | NaF | 2.00 | 1.00 |
| 49 | 0.01 | 100 | $Nb_2O_5$ $Ta_2O_5$ | 0.50 0.50 | $Na_2O$ | 0.02 | 0.02 |
| 50 | 0.01 | 100 | $La_2O_3$ $Dy_2O_3$ | 0.005 0.005 | $Na_2O$ NaF | 1.00 1.00 | 1.50 |
| 51 | 0.01 | 100 | $WO_3$ $Sm_2O_3$ | 1.50 1.50 | $Na_2O$ | 0.50 | 0.50 |
| 52 | 0.20 | 100 | $Ta_2O_5$ $Nd_2O_3$ | 0.20 0.30 | NaF $Na_2O$ | 1.00 0.50 | 1.00 |
| 53 | 0.20 | 100 | $Pr_6O_{11}$ $Y_2O_3$ | 0.005 0.005 | NaF | 2.00 | 1.00 |
| 54 | 0.20 | 100 | $Nd_2O_3$ $La_2O_3$ | 0.50 0.50 | NaF | 0.04 | 0.02 |
| 55 | 0.40 | 100 | $Nb_2O_5$ $WO_3$ | 1.00 1.00 | $Na_2O$ NaF | 2.00 1.00 | 2.50 |
| 56 | 0.40 | 100 | $CeO_2$ $Sm_2O_3$ | 0.20 0.30 | $Na_2O$ | 1.00 | 1.00 |
| 57 | 0.50 | 100 | $Dy_2O_3$ $Pr_6O_{11}$ | 1.00 2.00 | $Na_2O$ | 0.02 | 0.02 |
| 58 | 0.50 | 100 | $Y_2O_3$ $Ta_2O_5$ | 1.00 0.50 | NaF | 5.00 | 2.50 |
| 59 | 0.01 | 100 | $Nb_2O_5$ $Ta_2O_5$ $WO_3$ | 0.50 0.50 0.50 | $Na_2O$ NaF | 0.50 2.00 | 1.50 |
| 60 | 0.20 | 100 | $La_2O_3$ $Y_2O_3$ $Sm_2O_3$ | 1.00 1.00 1.00 | NaF | 0.04 | 0.02 |
| 61 | 0.40 | 100 | $CeO_2$ | 0.005 | $Na_2O$ | 0.50 | 0.50 |

TABLE 1-continued

Ceramic compositions in mole parts

| Examples | First ingredient, x | parts | Second ingredient, substance | parts | Third ingredient, substance | parts | Postfiring third ingredient ($Na_2O$), parts |
|---|---|---|---|---|---|---|---|
| 62 | 0.50 | 100 | $Dy_2O_3$ | 0.005 | $Na_2O$ | 1.50 | 1.50 |
|  |  |  | $Nb_2O_5$ | 0.005 |  |  |  |
|  |  |  | $Pr_6O_{11}$ | 0.50 |  |  |  |
|  |  |  | $Ta_2O_5$ | 0.50 |  |  |  |
|  |  |  | $La_2O_3$ | 1.00 |  |  |  |

TABLE 2

Varistor properties

| Examples | $V_1$, V | α | $\Delta V_1$, %/°C. | C, nF | $\Delta V_{1P}$, % | $\Delta\alpha_P$, % | $\Delta V_{1T}$, %/°C. |
|---|---|---|---|---|---|---|---|
| 1 | 10.0 | 18.7 | −0.02 | 137 | −1.0 | −1.0 | −0.02 |
| 2 | 12.8 | 20.0 | −0.02 | 162 | −0.4 | −0.4 | −0.02 |
| 3 | 15.4 | 20.8 | −0.02 | 160 | −0.2 | −0.3 | −0.02 |
| 4 | 15.9 | 22.1 | −0.02 | 148 | −0.3 | −0.4 | −0.02 |
| 5 | 14.3 | 18.6 | −0.02 | 130 | −0.7 | −0.6 | −0.02 |
| 6 | 34.1 | 21.0 | −0.01 | 136 | −0.5 | −0.6 | −0.01 |
| 7 | 30.4 | 23.3 | −0.01 | 141 | −0.3 | −0.3 | −0.01 |
| 8 | 38.7 | 23.4 | −0.01 | 133 | −0.5 | −0.5 | −0.01 |
| 9 | 40.5 | 20.1 | −0.01 | 134 | −0.7 | −0.8 | −0.01 |
| 10 | 45.0 | 19.7 | −0.01 | 121 | −0.9 | −1.0 | −0.01 |
| 11 | 24.8 | 24.7 | −0.01 | 137 | −0.2 | −0.4 | −0.01 |
| 12 | 26.6 | 22.6 | −0.01 | 127 | −0.3 | −0.4 | −0.01 |
| 13 | 21.1 | 24.7 | −0.01 | 126 | −0.4 | −0.4 | −0.01 |
| 14 | 21.6 | 23.4 | −0.01 | 118 | −0.5 | −0.5 | −0.01 |
| 15 | 20.0 | 22.0 | −0.01 | 124 | −0.3 | −0.4 | −0.01 |
| 16 | 30.1 | 23.2 | −0.01 | 102 | −0.9 | −1.0 | −0.01 |
| 17 | 38.3 | 21.9 | −0.01 | 90 | −0.9 | −0.9 | −0.01 |
| 18 | 30.8 | 22.0 | −0.01 | 94 | −0.8 | −0.9 | −0.01 |
| 19 | 36.4 | 22.4 | −0.01 | 103 | −1.0 | −1.0 | −0.01 |
| 20 | 30.7 | 22.3 | −0.01 | 101 | −0.7 | −0.7 | −0.01 |
| 21 | 13.2 | 19.6 | −0.02 | 127 | −0.8 | −0.8 | −0.02 |
| 22 | 14.6 | 18.0 | −0.01 | 126 | −0.7 | −0.7 | −0.01 |
| 23 | 11.2 | 18.7 | −0.02 | 126 | −0.7 | −0.7 | −0.02 |
| 24 | 17.8 | 18.6 | −0.01 | 130 | −0.7 | −0.7 | −0.01 |
| 25 | 164. | 19.1 | −0.02 | 128 | −0.9 | −0.9 | −0.02 |
| 26 | 27.6 | 23.8 | −0.01 | 154 | −0.5 | −0.7 | −0.01 |
| 27 | 24.6 | 23.4 | −0.01 | 142 | −0.6 | −0.7 | −0.01 |
| 28 | 22.7 | 20.2 | −0.01 | 135 | −0.6 | −0.7 | −0.01 |
| 29 | 20.1 | 23.5 | −0.01 | 155 | −0.5 | −0.5 | −0.01 |
| 30 | 24.8 | 22.5 | −0.01 | 159 | −0.4 | −0.4 | −0.01 |
| 31 | 43.3 | 19.5 | −0.01 | 115 | −0.8 | −0.9 | −0.01 |
| 32 | 40.2 | 21.9 | −0.01 | 122 | −0.7 | −0.8 | −0.01 |
| 33 | 47.2 | 21.5 | −0.01 | 115 | −0.9 | −1.0 | −0.01 |
| 34 | 46.3 | 21.3 | −0.01 | 121 | −0.8 | −0.8 | −0.01 |
| 35 | 46.7 | 19.1 | −0.01 | 119 | −1.0 | −1.0 | −0.01 |
| 36 | 14.2 | 18.8 | −0.01 | 91 | −0.9 | −0.9 | −0.01 |
| 37 | 12.8 | 24.9 | −0.01 | 110 | −0.6 | −0.6 | −0.01 |
| 38 | 15.2 | 23.1 | −0.01 | 118 | −0.5 | −0.5 | −0.01 |
| 39 | 15.4 | 22.4 | −0.01 | 104 | −0.6 | −0.7 | −0.01 |
| 40 | 19.3 | 20.9 | −0.01 | 99 | −0.9 | −1.0 | −0.01 |
| 41 | 32.6 | 20.4 | −0.01 | 82 | −15.0 | −22.0 | −0.11 |
| 42 | 36.0 | 22.7 | −0.01 | 81 | −12.7 | −20.6 | −0.10 |
| 43 | 30.9 | 23.0 | −0.01 | 74 | −14.5 | −22.1 | −0.15 |
| 44 | 29.8 | 7.2 | −0.09 | 77 | −11.1 | −12.1 | −0.16 |
| 45 | 21.2 | 6.1 | −0.12 | 75 | −14.6 | −14.0 | −0.20 |
| 46 | Not coherently bonded on firing. | | | | | | |
| 47 | Not coherently bonded on firing. | | | | | | |
| 48 | 35.4 | 7.4 | −0.15 | 62 | −10.1 | −10.0 | −0.21 |
| 49 | 10.8 | 18.4 | −0.02 | 130 | −0.8 | −0.8 | −0.02 |
| 50 | 11.0 | 19.3 | −0.02 | 161 | −0.8 | −0.7 | −0.02 |
| 51 | 15.6 | 19.0 | −0.02 | 141 | −0.9 | −1.0 | −0.02 |
| 52 | 13.0 | 22.7 | −0.01 | 166 | −0.6 | −0.5 | −0.01 |
| 53 | 11.3 | 20.6 | −0.02 | 150 | −0.8 | −0.8 | −0.02 |
| 54 | 17.4 | 18.6 | −0.01 | 144 | −1.0 | −0.9 | −0.01 |
| 55 | 31.2 | 20.8 | −0.01 | 108 | −0.8 | −0.8 | −0.01 |
| 56 | 37.8 | 24.4 | −0.01 | 121 | −0.4 | −0.6 | −0.01 |
| 57 | 37.0 | 20.2 | −0.01 | 116 | −0.9 | −1.0 | −0.01 |
| 58 | 36.4 | 20.5 | −0.01 | 110 | −0.8 | −0.7 | −0.01 |
| 59 | 27.6 | 21.5 | −0.02 | 130 | −0.6 | −0.6 | −0.02 |
| 60 | 44.6 | 20.9 | −0.01 | 121 | −1.0 | −1.0 | −0.01 |
| 61 | 42.7 | 23.5 | −0.01 | 133 | −0.4 | −0.4 | −0.01 |
| 62 | 40.1 | 24.2 | −0.01 | 144 | −0.7 | −0.8 | −0.01 |

Attention is called to the compositions of Examples 1–40 and 49–62 in Table 1. All these inventive Examples contain 100 parts of $Sr_{(1-x)}Ca_xTiO_3$, with the x set in the range from 0.01 to 0.50, from 0.01 to 3.00 parts of one or more of the metal oxides, and from 0.02 to 2.50 parts of $Na_2O$. Let us now study the properties of the test varistors in accordance with the inventive Examples in Table 2.

The varistor voltages ($V_1$) of the test varistors range from 10.0 to 47.2. These values are suitable for the use of the varistors in electronic circuits with voltage ratings of approximately 5–24 V. The nonlinearity coefficients (α) of the varistors are not less than 18.0. The temperature dependencies ($\Delta V_1$) of the varistor voltages are not more than 0.02%/°C. in absolute values. The capacitances (C) are not less than 90 nF (apparent relative dielectric constants not less than 161,000). The percent variations ($\Delta V_{1P}$) of the varistor voltages after surge application are not more than 1.0 percent in absolute values. The percent variations ($\Delta\alpha_P$) of the nonlinearity coefficients after surge application are also not more than 1.0 percent in absolute values. The temperature dependencies ($\Delta V_{1T}$) of the varistor voltages after surge application are not more than 0.02%/°C. in absolute values.

In the noninventive Examples 41, 42 and 43, on the other hand, the x of the general formula, $Sr_{(1-x)}Ca_x-TiO_3$, of the first ingredient is set at 0.55. The $\Delta V_{1P}$ and $\Delta\alpha_P$ of the test varistors according to these noninventive Examples are all far more than 12 percent in absolute values. Experiment has proved that if the x is less than 0.01, on the other hand, then the $\Delta V_1$ of the resulting varistors become higher than 0.03%/°C. in absolute values. Accordingly we set the range of the desired values of the x from about 0.01 to about 0.50.

In the noninventive Examples 44 and 45 the proportions of the third ingredient, $Na_2O$, are above 2.50 parts. The $\Delta V_{1P}$ and $\Delta\alpha_P$ of the test varistors according to these noninventive Examples exceed 10 percent in absolute values. Experiment has proved that no improvement results in the surge withstanding abilities of varistors if the proportion of the third ingredient falls short of 0.02 part. Thus, for the provision of surgeproof varistors, the proportion of the third ingredient should be from about 0.02 to about 2.50 parts, preferably from 0.50 to 1.50 parts.

The noninventive Examples 46, 47 and 48 contain 3.00 parts of $Sm_2O_3$, $La_2O_3$ and $WO_3$, respectively, as the second ingredient. The disclike moldings of Examples 46 and 47 were not coherently bonded together on firing. The varistors of Example 48 had poor properties. If the proportion of the second ingredient falls short of 0.01 part, the resulting ceramic materials are not sufficiently semiconductive, so that the varistors made therefrom have very low nonlinearity coefficients and suffer much from surges. The proportion of the second ingredient should therefore be from about 0.01 to about 3.00 parts.

It will be noted that in the inventive Examples 49–62, two or three different substances are employed, at least initially, as the second and/or third set of ingredients. The properties of the resulting varistors are as favorable as those of the varistors according to the other inventive Examples.

amples 1–62. The seven properties in question of these test varistors were then measured by the same methods and means as in Examples 1–62. Table 4 represents the results.

TABLE 3

| | | | Ceramic compositions in mole parts | | | | | | |
|---|---|---|---|---|---|---|---|---|---|
| | First ingredient, | | Second ingredient, | | Third ingredient, | | Fourth ingredient, | | Postfiring third ingredient |
| Examples | x | parts | substance | parts | substance | parts | substance | parts | ($Na_2O$), parts |
| 63 | 0.20 | 100 | $Nb_2O_5$ | 0.01 | $Na_2O$ | 1.00 | $Ag_2O$ | 0.01 | 1.00 |
| 64 | 0.20 | 100 | $La_2O_3$ | 0.50 | $Na_2O$ | 1.00 | CuO | 0.01 | 1.00 |
| 65 | 0.20 | 100 | $Dy_2O_3$ | 1.00 | $Na_2O$ | 1.00 | $MnO_2$ | 0.01 | 1.00 |
| 66 | 0.20 | 100 | $Ta_2O_5$ | 2.00 | $Na_2O$ | 1.00 | $SiO_2$ | 0.01 | 1.00 |
| 67 | 0.40 | 100 | $Pr_6O_{11}$ | 0.01 | NaF | 3.00 | $Ag_2O$ | 0.50 | 1.50 |
| 68 | 0.40 | 100 | $Nd_2O_3$ | 0.50 | NaF | 3.00 | CuO | 0.50 | 1.50 |
| 69 | 0.40 | 100 | $Y_2O_3$ | 1.00 | NaF | 3.00 | $MnO_2$ | 0.50 | 1.50 |
| 70 | 0.40 | 100 | $Sm_2O_3$ | 2.00 | NaF | 3.00 | $SiO_2$ | 0.50 | 1.50 |
| 71 | 0.01 | 100 | $WO_3$ | 3.00 | $Na_2O$ | 0.02 | $Ag_2O$ | 1.00 | 0.02 |
| 72 | 0.01 | 100 | $Y_2O_3$ | 2.00 | $Na_2O$ | 0.50 | CuO | 1.00 | 0.50 |
| 73 | 0.01 | 100 | $La_2O_3$ | 1.00 | $Na_2O$ | 1.00 | $MnO_2$ | 1.00 | 1.00 |
| 74 | 0.01 | 100 | $Pr_6O_{11}$ | 0.50 | $Na_2O$ | 2.50 | $SiO_2$ | 1.00 | 2.50 |
| 75 | 0.50 | 100 | $Nd_2O_3$ | 1.00 | NaF | 0.04 | $Ag_2O$ | 2.00 | 0.02 |
| 76 | 0.50 | 100 | $CeO_2$ | 1.00 | NaF | 1.00 | CuO | 2.00 | 0.50 |
| 77 | 0.50 | 100 | $Nb_2O_5$ | 1.00 | NaF | 2.00 | $MnO_2$ | 2.00 | 1.00 |
| 78 | 0.50 | 100 | $Ta_2O_5$ | 1.00 | NaF | 5.00 | $SiO_2$ | 2.00 | 2.50 |
| 79 | 0.40 | 100 | $Sm_2O_3$ | 0.01 | NaF | 2.00 | $Ag_2O$ | 3.00 | 1.00 |
| 80 | 0.40 | 100 | $Y_2O_3$ | 0.01 | NaF | 2.00 | CuO | 3.00 | 1.00 |
| 81 | 0.40 | 100 | $Nd_2O_3$ | 0.01 | NaF | 2.00 | $MnO_2$ | 3.00 | 1.00 |
| 82 | 0.40 | 100 | $La_2O_3$ | 0.01 | NaF | 2.00 | $SiO_2$ | 3.00 | 1.00 |
| 83 | 0.20 | 100 | $Ta_2O_5$ | 0.50 | $Na_2O$ | 0.02 | $Ag_2O$ | 3.50 | 0.02 |
| 84 | 0.20 | 100 | $Nb_2O_5$ | 1.00 | $Na_2O$ | 0.50 | CuO | 3.50 | 0.50 |
| 85 | 0.20 | 100 | $Dy_2O_3$ | 3.00 | $Na_2O$ | 1.00 | $MnO_2$ | 3.50 | 1.00 |
| 86 | 0.20 | 100 | $WO_3$ | 1.00 | $Na_2O$ | 2.50 | $SiO_2$ | 3.50 | 2.50 |
| 87 | 0.01 | 100 | $Nb_2O_5$ | 0.01 | $Na_2O$ | 2.50 | $Ag_2O$ CuO | 1.00 1.00 | 2.50 |
| 88 | 0.01 | 100 | $Dy_2O_3$ | 0.50 | $Na_2O$ | 1.50 | $Ag_2O$ $MnO_2$ | 0.005 0.005 | 1.50 |
| 89 | 0.20 | 100 | $WO_3$ | 1.00 | $Na_2O$ | 0.50 | $MnO_2$ $SiO_2$ | 0.20 0.30 | 0.50 |
| 90 | 0.20 | 100 | $Ta_2O_5$ $Nb_2O_5$ | 1.00 1.00 | $Na_2O$ | 0.02 | $Ag_2O$ $SiO_2$ | 1.00 1.00 | 0.02 |
| 91 | 0.40 | 100 | $Y_2O_3$ | 3.00 | NaF | 5.00 | CuO $SiO_2$ | 1.00 2.00 | 2.50 |
| 92 | 0.40 | 100 | $La_2O_3$ $Y_2O_3$ | 0.50 0.50 | NaF | 3.00 | CuO $MnO_2$ | 0.50 0.50 | 1.50 |
| 93 | 0.50 | 100 | $CeO_2$ | 0.01 | NaF | 1.00 | $Ag_2O$ CuO | 0.30 0.20 | 0.50 |
| 94 | 0.50 | 100 | $Nd_2O_3$ | 3.00 | NaF | 0.04 | $Ag_2O$ $MnO_2$ | 2.00 1.00 | 0.02 |
| 95 | 0.20 | 100 | $Sm_2O_3$ | 1.00 | $Na_2O$ | 1.00 | $MnO_2$ $SiO_2$ CuO | 0.01 0.01 1.00 | 1.00 |
| 96 | 0.20 | 100 | $Dy_2O_3$ $WO_3$ | 1.50 1.50 | $Na_2O$ | 1.00 | $MnO_2$ $SiO_2$ | 1.00 1.00 | 1.00 |
| 97 | 0.01 | 100 | $Pr_6O_{11}$ | 0.50 | $Na_2O$ | 1.00 | $Ag_2O$ CuO $MnO_2$ | 0.50 0.50 0.50 | 1.00 |

EXAMPLES 63–97

The four inventive examples of the first ingredient, $Sr_{0.99}Ca_{0.01}TiO_3$, $Sr_{0.80}Ca_{0.20}TiO_3$, $Sr_{0.60}Ca_{0.40}TiO_3$, and $Sr_{0.50}Ca_{0.50}TiO_3$, used in Examples 1–62 were prepared by the same method as above. To 100 parts of each example of the first ingredient in finely divided form there were added: (1) one or more of $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$, and $Sm_2O_3$ in finely divided form as the second ingredient or set of ingredients; (2) either or both of $Na_2O$ and NaF in finely divided form as the third ingredient or set of ingredients; and (3) one or more of $Ag_2O$, CuO, $MnO_2$ and $SiO_2$ in finely divided form as the fourth ingredient or set of ingredients. Thirty-five combinations of the four or more ingredients were prepared in different sets of proportions specified in Table 3.

The above combinations of the ingredients were processed into test varistors by the same method as in Ex-

TABLE 4

| | Varistor properties | | | | | | |
|---|---|---|---|---|---|---|---|
| Examples | $V_1$, V | $\alpha$ | $\Delta V_1$, %/°C. | C, nF | $\Delta V_{1P}$, % | $\Delta \alpha_P$, % | $\Delta V_{1T}$, %/°C. |
| 63 | 25.9 | 26.0 | −0.01 | 157 | −0.4 | −0.5 | −0.01 |
| 64 | 20.9 | 28.3 | −0.01 | 167 | −0.4 | −0.6 | −0.01 |
| 65 | 29.7 | 27.4 | −0.01 | 166 | −0.6 | −0.6 | −0.01 |
| 66 | 21.1 | 25.1 | −0.01 | 147 | −0.5 | −0.5 | −0.01 |
| 67 | 30.1 | 30.7 | −0.01 | 134 | −0.4 | −0.4 | −0.01 |
| 68 | 38.7 | 33.7 | −0.01 | 122 | −0.4 | −0.6 | −0.01 |
| 69 | 34.5 | 34.6 | −0.01 | 130 | −0.5 | −0.7 | −0.01 |
| 70 | 39.7 | 32.7 | −0.01 | 114 | −0.7 | −0.8 | −0.01 |
| 71 | 22.5 | 24.4 | −0.02 | 133 | −0.9 | −1.0 | −0.02 |
| 72 | 21.1 | 26.2 | −0.01 | 120 | −0.8 | −0.9 | −0.01 |
| 73 | 24.6 | 26.0 | −0.02 | 137 | −0.7 | −0.8 | −0.02 |
| 74 | 27.9 | 25.4 | −0.01 | 116 | −0.8 | −0.9 | −0.01 |
| 75 | 15.1 | 21.3 | −0.01 | 106 | −0.9 | −0.8 | −0.01 |
| 76 | 10.2 | 27.0 | −0.01 | 118 | −0.7 | −0.9 | −0.01 |
| 77 | 16.6 | 29.7 | −0.01 | 124 | −0.5 | −0.6 | −0.01 |

TABLE 4-continued

Varistor properties

| Examples | $V_1$, V | $\alpha$ | $\Delta V_1$, %/°C. | C, nF | $\Delta V_{1P}$, % | $\Delta \alpha_P$, % | $\Delta V_{1T}$, %/°C. |
|---|---|---|---|---|---|---|---|
| 78 | 11.2 | 24.6 | −0.01 | 102 | −0.8 | −0.8 | −0.01 |
| 79 | 31.5 | 25.5 | −0.01 | 95 | −0.9 | −1.0 | −0.01 |
| 80 | 30.0 | 24.1 | −0.01 | 95 | −1.0 | −1.0 | −0.01 |
| 81 | 34.7 | 25.9 | −0.01 | 99 | −1.0 | −1.0 | −0.01 |
| 82 | 37.5 | 24.1 | −0.01 | 85 | −0.8 | −0.9 | −0.01 |
| 83 | 40.1 | 21.0 | −0.01 | 80 | −12.6 | −15.5 | −0.15 |
| 84 | 48.2 | 27.8 | −0.01 | 72 | −17.8 | −20.5 | −0.20 |
| 85 | 40.8 | 24.4 | −0.01 | 82 | −20.4 | −25.9 | −0.18 |
| 86 | 46.4 | 26.9 | −0.01 | 60 | −10.2 | −9.5 | −0.12 |
| 87 | 22.6 | 27.9 | −0.02 | 120 | −1.0 | −1.0 | −0.02 |
| 88 | 21.1 | 23.1 | −0.02 | 116 | −0.8 | −0.8 | −0.02 |
| 89 | 14.6 | 29.0 | −0.01 | 141 | −0.6 | −0.7 | −0.01 |
| 90 | 17.9 | 24.8 | −0.01 | 121 | −0.9 | −0.9 | −0.01 |
| 91 | 35.1 | 25.4 | −0.01 | 100 | −0.8 | −0.9 | −0.01 |
| 92 | 30.2 | 32.9 | −0.01 | 114 | −0.6 | −0.6 | −0.01 |
| 93 | 16.6 | 27.2 | −0.01 | 127 | −0.7 | −0.8 | −0.01 |
| 94 | 11.1 | 22.1 | −0.01 | 120 | −0.9 | −1.0 | −0.01 |
| 95 | 21.5 | 24.4 | −0.01 | 138 | −0.6 | −0.6 | −0.01 |
| 96 | 20.0 | 21.7 | −0.01 | 101 | −1.0 | −1.0 | −0.01 |
| 97 | 44.8 | 34.5 | −0.01 | 126 | −0.8 | −0.9 | −0.01 |

Let us consider the compositions of Examples 63–82 and 87–97 in Table 3. All these Examples contain from 0.01 to 3.00 parts of one or more of $Ag_2O$, CuO, $MnO_2$ and $SiO_2$ as the fourth ingredient or set of ingredients. As is seen from Table 4, the varistors of these inventive compositions suffer little from surges and also have high nonlinearity coefficients ($\alpha$). The varistor voltages ($V_1$) are in the range from 10 to 50 V, and the nonlinearity coefficients ($\alpha$) are in the range from 20 to 35. The capacitances (C) are not less than 85 nF (apparent relative dielectric constants not less than 153,000). The percent variations ($\Delta V_{1P}$) of the varistor voltages after surge application are not more than 1.0 percent in absolute values. The percent variations ($\Delta \alpha_P$) of the nonlinearity coefficients after surge application are also not more than 1.0 percent in absolute values. The temperature dependencies ($\Delta V_{1T}$) of the varistor voltages after surge application are not more than 0.02%/°C. in absolute values.

In Examples 83–86 the proportions of the fourth ingredients are set at 3.50. The varistors of these noninventive Examples are very vulnerable to surges. The absolute values of their $\Delta V_{1P}$ and $\Delta \alpha_P$ are mostly higher than 10 percent, and the absolute values of their $\Delta V_{1T}$ are also higher than 0.10 percent. If its proportion falls short of 0.01 part, on the other hand, then the fourth ingredient or set of ingredients become unable to improve the nonlinearity coefficient. We conclude from the foregoing results that the proportion of the fourth ingredient or set of ingredients should be from about 0.01 to about 3.00 parts.

Even when combined with the fourth ingredient or set of ingredients as above, the first, second and third ingredients serve the same purposes as those set forth in conjunction with Examples 1–62. Examples 63–82 and 87–97 prove, therefore, that the ceramic compositions comprising 100 parts of the first ingredient, from about 0.01 to about 3.00 parts of the second ingredient, from about 0.02 to about 2.50 parts of the third ingredient, and from about 0.01 to about 3.00 parts of the fourth ingredient in accordance with our invention make possible the provision of varistors whose varistor voltages are hardly affected by ambient temperatures, which suffer little from surges, and which have high nonlinearity coefficients.

EXAMPLES 98–108

The four inventive examples of the first ingredient, $Sr_{(1-x)}Ca_xTiO_3$, with the x set at 0.01, 0.20, 0.40 and 0.50, were prepared by the same method as in Examples 1–62. A hundred parts of each example of the first ingredient in finely divided form was admixed with: (1) a second ingredient chosen from among $Nb_2O_5$, $Ta_2O_5$, $WO_3$, $La_2O_3$, $CeO_2$, $Nd_2O_3$, $Pr_6O_{11}$, $Dy_2O_3$, $Y_2O_3$ and $Sm_2O_3$ in finely divided form; (2) a third ingredient chosen from between $Na_2O$ and NaF in finely divided form; and (3) $Al_2O_3$ in finely divided form. Eleven combinations of the four ingredients were prepared in different sets of proportions as in Table 5.

The above combinations of four substances were processed into test varistors by the same method as in Examples 1–62. The seven properties in question of the thus fabricated varistors were then measured by the same methods and means as in Examples 1–62. Table 6 represents the results.

TABLE 5

| | Ceramic compositions in mole parts | | | | | | |
|---|---|---|---|---|---|---|---|
| | First ingredient, | | Second ingredient, | | Third ingredient, | | $Al_2O_3$, | Postfiring third ingredient |
| Examples | x | parts | substance | parts | substance | parts | parts | ($Na_2O$), parts |
| 98 | 0.20 | 100 | $Nb_2O_5$ | 0.01 | NaF | 2.00 | 0.01 | 1.00 |
| 99 | 0.20 | 100 | $La_2O_5$ | 0.50 | NaF | 2.00 | 1.00 | 1.00 |
| 100 | 0.01 | 100 | $Y_2O_3$ | 0.50 | $Na_2O$ | 2.50 | 0.10 | 2.50 |
| 101 | 0.01 | 100 | $Sm_2O_3$ | 3.00 | $Na_2O$ | 2.50 | 1.50 | 2.50 |
| 102 | 0.40 | 100 | $CeO_2$ | 0.50 | NaF | 1.00 | 1.50 | 0.50 |
| 103 | 0.40 | 100 | $Dy_2O_3$ | 3.00 | NaF | 1.00 | 0.01 | 0.50 |
| 104 | 0.50 | 100 | $WO_3$ | 0.01 | $Na_2O$ | 0.02 | 0.50 | 0.02 |
| 105 | 0.50 | 100 | $Nd_2O_3$ | 3.00 | $Na_2O$ | 0.02 | 0.50 | 0.02 |
| 106 | 0.20 | 100 | $Pr_6O_{11}$ | 3.00 | NaF | 1.00 | 0.10 | 0.50 |
| 107 | 0.20 | 100 | $Nb_2O_5$ | 0.01 | NaF | 2.00 | 2.00 | 1.00 |
| 108 | 0.50 | 100 | $Nd_2O_3$ | 3.00 | $Na_2O$ | 0.02 | 2.00 | 0.02 |

TABLE 6

Varsitor properties

| Examples | $V_1$, V | $\alpha$ | $\Delta V_1$, %/°C. | C, nF | $\Delta V_{1P}$, % | $\Delta \alpha_P$, % | $\Delta V_{1T}$, %/°C. |
|---|---|---|---|---|---|---|---|
| 98 | 28.6 | 23.1 | −0.01 | 135 | −0.5 | −0.6 | −0.01 |
| 99 | 26.7 | 25.8 | 0 | 110 | −0.7 | −0.5 | 0 |
| 100 | 20.4 | 26.7 | −0.01 | 146 | −0.5 | −0.6 | −0.01 |
| 101 | 22.2 | 22.8 | −0.01 | 101 | −0.8 | −0.7 | −0.01 |
| 102 | 35.0 | 28.9 | 0 | 92 | −0.6 | −0.6 | 0 |
| 103 | 36.4 | 26.2 | −0.01 | 100 | −0.5 | −0.6 | −0.01 |
| 104 | 12.3 | 26.0 | +0.01 | 131 | −0.7 | −0.7 | +0.01 |
| 105 | 13.0 | 24.4 | +0.01 | 115 | −0.8 | −0.7 | +0.01 |
| 106 | 44.4 | 26.8 | 0 | 119 | −0.7 | −0.8 | 0 |
| 107 | 24.6 | 20.0 | 0.01 | 60 | −12.7 | −24.3 | −0.23 |
| 108 | 14.8 | 17.8 | +0.01 | 86 | −14.2 | −26.4 | −0.25 |

Examples 98–106 are in conformity with the principles of our invention. As seen from their compositions given in Table 5, all these inventive Examples contain 100 parts of the first ingredient, from 0.01 to 3.00 parts of the second ingredient, from 0.02 to 2.50 parts of the third ingredient, and from 0.01 to 1.50 parts of $Al_2O_3$. A reference to Table 6 will reveal that the test varistors of these inventive compositions have nonlinearity coefficients ($\alpha$) ranging from 22.8 to 28.9, and that their temperature dependencies ($\Delta V_1$) of the varistor voltages are as small as 0.01%/°C. or even less in absolute values. It will be seen, then, that $Al_2O_3$ functions just like the fourth ingredient or set of ingredients in Examples 63–97. Added in proportions ranging from 0.01 to 1.50 parts to the first, second and third ingredients, $Al_2O_3$ serves to improve the nonlinearity coefficients of the resulting varistors and to lessen the temperature dependencies of their varistor voltages.

Examples 107 and 108 are noninventive. These Examples contain 2.00 parts of $Al_2O_3$, with the result that the corresponding varistors have very high absolute values of the percent variations ($\Delta V_{1P}$ and $\Delta \alpha_p$) of the varistor voltages and nonlinearity coefficients after surge application. Used in amounts less than 0.01 part, $Al_2O_3$ has proved to be unable to improve the nonlinearity coefficient and the temperature dependency of the varistor voltage, among other properties. The proportion of $Al_2O_3$ should therefore be from about 0.01 to about 1.50 parts.

EXAMPLES 109–125

The four inventive examples of the first ingredient, $Sr_{(1-x)}Ca_xTiO_3$, with the x having values of 0.01, 0.20, 0.40 and 0.50, were prepared by the same method as in Examples 1–62. A hundred parts of each of these examples of the first ingredient in finely divided form was admixed with: (1) the second ingredient or set of ingredients selected from among $Nb_5O_5$, $Ta_2O_5$, $WO_3$, $La_2O_3$, $CeO_2$, $Nd_2O_3$, $Pr_6O_{11}$, $Dy_2O_3$, $Y_2O_3$ and $Sm_2O_3$ in finely divided form; (2) the third ingredient selected from between $Na_2O$ and NaF in finely divided form; (3) the fourth ingredient or set of ingredients selected from among $Ag_2O$, CuO, $MnO_2$ and $SiO_2$ in finely divided form; and (4) $Al_2O_3$ in finely divided form. Seventeen combinations of the five or more substances were prepared in different sets of proportions specified in Table 7.

The above combinations of the substances were processed into test varistors by the same method as in Examples 1–62. The seven properties in question of the thus fabricated varistors were then measured by the same methods and means as in Examples 1–62. The results were as given in Table 8.

TABLE 7

| | | | | | | | | | Postfiring third ingredient |
|---|---|---|---|---|---|---|---|---|---|
| | First ingredient, | | Second ingredient, | | Third ingredient, | | Fourth ingredient, | $Al_2O_3$, | |
| Examples | x | parts | substance | parts | substance | parts | substance | parts | parts | ($Na_2O$), parts |
| 109 | 0.20 | 100 | $Nb_2O_5$ | 0.01 | $Na_2O$ | 1.00 | $Ag_2O$ | 0.01 | 1.50 | 1.00 |
| 110 | 0.20 | 100 | $La_2O_3$ | 0.50 | $Na_2O$ | 1.00 | CuO | 0.01 | 0.01 | 1.00 |
| 111 | 0.40 | 100 | $Y_2O_3$ | 1.00 | NaF | 3.00 | $MnO_2$ | 0.50 | 1.00 | 1.50 |
| 112 | 0.40 | 100 | $Sm_2O_3$ | 2.00 | NaF | 3.00 | $SiO_2$ | 0.50 | 0.01 | 1.50 |
| 113 | 0.50 | 100 | $Nd_2O_3$ | 1.00 | NaF | 0.04 | $Ag_2O$ | 2.00 | 0.50 | 0.02 |
| 114 | 0.50 | 100 | $Ta_2O_5$ | 1.00 | NaF | 5.00 | $SiO_2$ | 2.00 | 1.50 | 2.50 |
| 115 | 0.01 | 100 | $WO_3$ | 3.00 | $Na_2O$ | 0.02 | $Ag_2O$ | 1.00 | 1.00 | 0.02 |
| 116 | 0.01 | 100 | $Y_2O_3$ | 2.00 | $Na_2O$ | 0.50 | CuO | 1.00 | 0.01 | 0.50 |
| 117 | 0.40 | 100 | $Nd_2O_3$ | 0.01 | NaF | 2.00 | $MnO_2$ | 3.00 | 1.50 | 1.00 |
| 118 | 0.40 | 100 | $La_2O_3$ | 0.01 | NaF | 2.00 | $SiO_2$ | 3.00 | 0.50 | 1.00 |
| 119 | 0.01 | 100 | $Pr_6O_{11}$ | 0.50 | $Na_2O$ | 2.50 | $SiO_2$ | 1.00 | 1.00 | 2.50 |
| 120 | 0.01 | 100 | $Nb_2O_5$ | 0.01 | $Na_2O$ | 2.50 | $Ag_2O$ CuO | 1.00 1.00 | 0.50 | 2.50 |
| 121 | 0.01 | 100 | $WO_3$ | 1.00 | $Na_2O$ | 0.50 | $MnO_2$ $SiO_2$ | 0.20 0.30 | 0.01 | 0.50 |
| 122 | 0.20 | 100 | $Ta_2O_3$ $La_2O_3$ | 2.00 1.00 | $Na_2O$ | 0.50 | CuO $SiO_2$ | 1.00 2.00 | 1.50 | 0.50 |
| 123 | 0.20 | 100 | $Y_2O_3$ | 0.01 | $Na_2O$ | 0.02 | CuO $SiO_2$ | 2.50 0.50 | 1.00 | 0.02 |
| 124 | 0.40 | 100 | $Nd_2O_3$ | 3.00 | $Na_2O$ | 0.02 | $MnO_2$ $SiO_2$ | 2.00 0.10 | 0.01 | 0.02 |
| 125 | 0.40 | 100 | $Dy_2O_3$ | 0.50 | $Na_2O$ | 1.50 | $MnO_2$ $SiO_2$ CuO | 0.01 1.00 1.00 | 0.50 | 1.50 |

TABLE 8

| | Varistor properties | | | | | | |
|---|---|---|---|---|---|---|---|
| Examples | $V_1$, V | $\alpha$ | $\Delta V_1$, %/°C. | C, nF | $\Delta V_{1P}$, % | $\Delta \alpha_P$, % | $\Delta V_{1T}$, %/°C. |
| 109 | 24.6 | 28.9 | +0.01 | 142 | −0.5 | −0.5 | +0.01 |
| 110 | 22.0 | 31.8 | −0.01 | 167 | −0.4 | −0.5 | −0.01 |
| 111 | 31.4 | 36.9 | 0 | 136 | −0.5 | −0.6 | 0 |
| 112 | 42.1 | 34.5 | 0 | 121 | −0.5 | −0.6 | 0 |
| 113 | 15.6 | 27.3 | 0 | 118 | −0.7 | −0.7 | 0 |
| 114 | 14.2 | 25.7 | +0.01 | 100 | −0.9 | −1.0 | +0.01 |
| 115 | 24.0 | 28.7 | 0 | 132 | −0.8 | −0.9 | 0 |
| 116 | 24.5 | 28.3 | −0.01 | 124 | −0.6 | −0.7 | −0.01 |
| 117 | 32.4 | 27.0 | +0.01 | 97 | −0.9 | −1.0 | +0.01 |
| 118 | 41.3 | 29.6 | 0 | 81 | −0.8 | −0.9 | 0 |
| 119 | 24.8 | 28.4 | 0 | 111 | −0.8 | −0.8 | 0 |
| 120 | 24.7 | 29.9 | 0 | 122 | −0.8 | −0.8 | 0 |
| 121 | 11.6 | 31.2 | −0.01 | 152 | −0.5 | −0.5 | −0.01 |
| 122 | 36.0 | 27.8 | +0.01 | 90 | −0.5 | −0.5 | +0.01 |
| 123 | 33.8 | 30.8 | 0 | 111 | −0.6 | −0.7 | 0 |
| 124 | 45.1 | 28.0 | −0.01 | 87 | −0.7 | −0.8 | −0.01 |
| 125 | 40.9 | 33.4 | 0 | 92 | −0.6 | −0.6 | 0 |

The ceramic compositions of Examples 109–125 are all in accord with the principles of our invention, comprising 100 parts of the first ingredient, from 0.01 to 3.00 parts of the second ingredient or set of ingredients, from 0.02 to 2.50 parts of the third ingredient, from 0.01 to 3.00 parts of the fourth ingredient or set of ingredients, and from 0.01 to 1.50 parts of $Al_2O_3$, as in Table 7. An inspection of Table 8 will show that the test varistors of these inventive compositions have nonlinearity coefficients ($\alpha$) in the range from 25.7 to 36.9, and that their temperature dependencies ($\Delta V_1$) of varistor voltages are as low as 0.01 or even less in absolute values.

Examples 109–121 have compositions identical with those of Examples 63, 64, 69, 70, 78, 71, 72, 81, 82, 74, 87 and 89, respectively, except that the former additionally contain $Al_2O_3$. A composition of these Examples will make clear that the addition of $Al_2O_3$ can make higher the nonlinearity coefficient of the resulting varistors.

Experiment has proved that, when used in amounts in excess of 1.5 parts in combination with the first, second third and fourth ingredients, $Al_2O_3$ adversely affects the percent variations of the varistor voltage and nonlinearity coefficient after surge application. When the proportion of $Al_2O_3$ is less than 0.01 part, it is unable to improve the nonlinearity coefficient and the temperature dependency of the varistor voltage. Thus the proportion of $Al_2O_3$, when it is used in combination with the first, second, third and fourth ingredients, should also be from about 0.01 to about 1.50 parts.

EXAMPLE 126

In this Example we sought to ascertain if $Na_2O$, the third ingredient, could be added to ceramic bodies after the initial firing thereof, rather than being used as one of the starting materials, for the provision of varistors of just as favorable properties.

We employed $Sr_{0.80}Ca_{0.20}TiO_3$ as the first ingredient. One hundred parts of this first ingredient was admixed with 0.50 part of $Ta_2O_5$ as the second ingredient. Charged into a mortar, the first and second ingredients were stirred dry for 20 hours. Then 10 to 15 percent by weight of polyvinyl alcohol was added as a temporary binder to the intimate mixture of the first and second ingredients for granulating the same. Test discs were molded from the granulated mixture by pressing at approximately 1500 kg/cm². Each disc was sized 10 mm in diameter and 0.8 mm in thickness as in the preceding Examples. Also as in the preceding Examples the test discs were then fired at approximately 1350° C. for four hours in a reductive atmosphere consisting of 95 percent by capacity $N_2$ and five percent by capacity $H_2$.

Then, as a material for the desired $Na_2O$ to be contained in the completed ceramic bodies, NaF was pasted and coated on one face of each ceramic test disc, prepared as above, at a rate of 0.85 mg/cm². The coated discs were refired in a temperature range from 900° C. to 1300° C. for two hours in air. This heat treatment caused thermal diffusion of $Na_2O$, derived from the NaF paste, into the ceramic test discs. These were then processed into test varistors through the same procedure as in Example 1–62.

The seven properties in question of the thus fabricated test varistors were measured by the same methods and the same means as in Examples 1–62. The varistor voltages of the test varistors averaged 13.5 V; their nonlinearity coefficients 18.7; their temperature dependencies of the varistor voltages −0.01%/°C.; their capacitances 150 nF; their percent variations of the varistor voltages after surge application −0.5%; their percent variations of the nonlinearity coefficients after surge application −0.6%; and their temperature dependencies of the varistor voltages after surge application −0.01%/°C.

EXAMPLE 127

In this Example we also tested the thermal diffusion of $Na_2O$ in ceramic bodies during the refiring thereof. As the starting materials of the ceramic bodies, however, we used a combination of 100 parts of $Sr_{0.60}Ca_{0.40}TiO_3$ as the first ingredient, 1.00 part of $Nb_2O_5$ as the second ingredient, and 0.10 part of $MnO_2$ as the fourth ingredient.

The above combination of ingredients was processed into ceramic test discs through the same procedure as in Example 126. Then, instead of the NaF paste of Example 126, an $Na_2O$ paste was coated on one face of each ceramic test disc at a rate of 1.65 mg/cm². The coated discs were refired in the temperature range from 900° C. to 1300° C. for two hours in air, thereby causing thermal diffusion of $Na_2O$ into the discs. The thus completed ceramic test discs in accordance with our invention were then processed into test varistors through the same procedure as in Examples 1–62.

The seven pertinent properties of the test varistors were measured by the same methods and the same means as in Examples 1–62. The varistor voltages of the test varistors averaged 32.4 V; their nonlinearity coefficients 33.2; their temperature dependencies of the varistor voltages −0.01%/°C.; their capacitances 113 nF; their percent variations of the varistor voltages after surge application −0.6%; their percent variations of the nonlinearity coefficients after surge application −0.5%; and their temperature dependencies of the varistor voltages after surge application −0.01%/°C.

The foregoing results of Examples 126 and 127 prove that the thermal diffusion of $Na_2O$ in fired ceramic bodies makes possible the provision of surgeproof varistors that are just as favorable in the properties under consideration as those produced by use of the sodium compound as one of the starting materials. This holds true whether the ceramic bodies additionally comprise the first and second ingredients, as in Example 126, or the first, second and fourth ingredients as in Example 127.

The above Examples and additional experiments conducted by us have revealed the following findings:

1. The initial firing of moldings in a reductive atmosphere should be effected in the temperature range from about 1300° C. to about 1500° C., preferably from 1350° C. to 1450° C., and for the period from about two to about eight hours.

2. The refiring of the moldings for oxidation should be effected in the temperature range from about 850° C. to about 1350° C. and for the period from about one to about five hours.

3. Unlike the foregoing disclosure, the starting materials for the second set of ingredients need not be the same substances as those which are required to be present in the completed ceramic bodies. All that is required is that the completed ceramic materials contain one or more of the listed metal oxides. Thus the starting materials may be metallic elements, carbonates, hydroxides, nitrates, or oxalates that can be converted into the desired metal oxides in the process of ceramic manufacture.

4. Additives may be used for further improvement of the properties of the ceramic materials in accordance with our invention.

5. The proportion of the organic binder for granulating the mixtures of the first, second and third ingredients, or of the first, second, third and fourth ingredients, with or without Al$_2$O$_3$, should be from about five to about 20 percent by weight, preferably from 10 to 15 percent by weight, of the total amount of each mixture.

6. The initial firing of moldings need not necessarily be in a reductive atmosphere but may be in a neutral atmosphere. The term, "nonoxidative atmosphere," as used herein and in the claims appended hereto should be understood to comprehend both reductive and neutral atmospheres.

7. The granulated mixtures of the various ingredients in accordance with our invention may be molded into any desired shape at pressures anywhere from about 500 to about 2000 kg/cm$^2$.

8. In the manufacture of ceramic materials with use of Al$_2$O$_3$ as an additive, Na$_2$O may also be thermally diffused in the ceramic bodies by coating the same with a pasted sodium compound after the initial firing thereof, as in Examples 126 and 127.

Additional modifications and variations of our invention may be resorted to by the ceramics specialists without departing from the spirit or scope of the following claims.

What we claim is:

1. A process for fabricating bodies of a semiconductive ceramic material with a voltage-dependent nonlinear resistance, which comprises providing a mixture of 100 mole parts of Sr$_{(1-x)}$Ca$_x$TiO$_3$ in finely divided form, where x is a numeral from about 0.01 to about 0.50, from about 0.01 to about 3.00 mole parts of at least one metal oxide in finely divided form selected from the group consisting of Nb$_2$O$_5$, Ta$_2$O$_5$, WO$_3$, La$_2$O$_3$, CeO$_2$, Nd$_2$O$_3$, Y$_2$O$_3$, Sm$_2$O$_3$, Pr$_6$O$_{11}$ and Dy$_2$O$_3$, and an organic binder, forming the mixture into moldings of desired shape and size, firing the moldings in a temperature range from about 1300° C. to about 1500° C. in a nonoxidative atmosphere, refiring thee moldings in a temperature range from about 850° C. to about 1350° C. in an oxidative atmosphere to complete ceramic bodies, and adding from about 0.02 to about 2.50 mole parts of Na$_2$O to the ceramic bodies not later than the refiring of the moldings.

2. A process as defined in claim 1, wherein the Na$_2$O is included in the initially provided mixture in the form of at least one sodium compound in finely divided form.

3. A process as defined in claim 1, wherein the Na$_2$O is thermally diffused in the moldings by forming a layer of at least one sodium compound on each molding after the firing thereof and then by refiring the moldings together with the layers of the sodium compound thereon.

4. A process as defined in claim 2 or 3, wherein the sodium compound is selected from the group consisting of Na$_2$O and NaF.

5. A process as defined in claim 3, wherein the moldings together with the layers of the sodium compound thereon are refired in a temperature range from about 900° C. to about 1300° C.

6. A process as defined in claim 1, 2 or 3, wherein the mixture further comprises from about 0.01 to about 3.00 mole parts of at least one oxide in finely divided form selected from the group consisting of Ag$_2$O, CuO, MnO$_2$ and SiO$_2$.

7. A process as defined in claim 6, wherein the mixture further comprises from about 0.01 to about 1.50 mole parts of Al$_2$O$_3$ in finely divided form.

8. A process as defined in claim 1, 2 or 3, wherein the mixture further comprises from about 0.01 to about 1.50 mole parts of Al$_2$O$_3$ in finely divided form.

* * * * *